(12) United States Patent
Wiegman et al.

(10) Patent No.: US 12,486,029 B2
(45) Date of Patent: Dec. 2, 2025

(54) AIRCRAFT HAVING REVERSE THRUST CAPABILITIES

(71) Applicant: BETA AIR, LLC, South Burlington, VT (US)

(72) Inventors: Herman Lucas Norbert Wiegman, Essex Junction, VT (US); Nathan William Joseph Wiegman, Essex Junction, VT (US); Riley Clinton Griffin, Montpelier, VT (US); Lochie Ferrier, Sydney (AU)

(73) Assignee: BETA AIR LLC, South Burlington, VT (US)

( * ) Notice: Subject to any disclaimer, the term of this patent is extended or adjusted under 35 U.S.C. 154(b) by 114 days.

(21) Appl. No.: 18/103,627

(22) Filed: Jan. 31, 2023

(65) Prior Publication Data

US 2023/0227147 A1    Jul. 20, 2023

Related U.S. Application Data

(63) Continuation-in-part of application No. 17/319,155, filed on May 13, 2021, now Pat. No. 11,597,508.

(51) Int. Cl.
*B64C 29/00* (2006.01)
*B64C 13/04* (2006.01)
(Continued)

(52) U.S. Cl.
CPC .......... *B64C 29/0025* (2013.01); *B64C 13/04* (2013.01); *B64D 27/34* (2024.01);
(Continued)

(58) Field of Classification Search
CPC .................. B64C 29/0016; B64C 29/0025
See application file for complete search history.

(56) References Cited

U.S. PATENT DOCUMENTS

| 5,890,441 A | 4/1999 | Swinson |
| 6,519,929 B2 | 2/2003 | Ahrendt |

(Continued)

FOREIGN PATENT DOCUMENTS

| EP | 2883788 A1 | 6/2015 |
| EP | 2883788 B1 | 10/2018 |

OTHER PUBLICATIONS

PCT International Preliminary Report on Patentability for International Application No. PCT/US23/20969, Dated Nov. 14, 2024, 11 pages.

(Continued)

*Primary Examiner* — Nicholas McFall
(74) *Attorney, Agent, or Firm* — Lee & Hayes, P.C.

(57) ABSTRACT

An aircraft having reverse thrust capabilities, the aircraft includes a fuselage, a plurality of flight components configured to enable the aircraft at a low-speed flight mode, a pilot control, a sensor, an energy source, and a flight controller configured to receive the aircraft datum from the sensor at an initial time, wherein the initial time occurs when at least a flight component of the plurality of flight components produces a positive thrust, initiate a reverse thrust command as a function of the aircraft datum at a subsequent time wherein the reverse thrust command causes the at least a flight component of the plurality of flight components to produce a negative thrust, and the subsequent time occurs temporally after the initial time, and command the at least a flight component of the plurality of flight components to enter a speed reversal region.

20 Claims, 8 Drawing Sheets

(51) Int. Cl.
*B64D 27/34* (2024.01)
*B64D 27/351* (2024.01)
*B64D 27/357* (2024.01)
*B64D 31/06* (2006.01)
*B64D 31/16* (2024.01)

(52) U.S. Cl.
CPC ......... *B64D 27/351* (2024.01); *B64D 27/357* (2024.01); *B64D 31/06* (2013.01); *B64D 31/16* (2024.01); *B60L 2200/10* (2013.01)

(56) References Cited

U.S. PATENT DOCUMENTS

| | | | |
|---|---|---|---|
| 6,974,107 | B2 | 12/2005 | Christensen |
| 7,370,468 | B2 | 5/2008 | Colotte |
| 8,402,743 | B2 | 3/2013 | Nouhaud |
| 8,615,982 | B2 | 12/2013 | Sundstrom |
| 9,120,579 | B2 | 9/2015 | De Smet |
| 9,188,081 | B2 | 11/2015 | Wingett |
| 9,488,130 | B2 | 11/2016 | Chakkera |
| 10,018,151 | B2 | 7/2018 | Nakhjavani |
| 10,101,719 | B1 * | 10/2018 | Kroo .................. G05B 17/02 |
| 10,443,540 | B2 | 10/2019 | Marcos |
| 10,703,498 | B2 | 7/2020 | Hodges |
| 10,724,475 | B2 | 7/2020 | Chuck |
| 10,794,327 | B2 | 10/2020 | Guerinot |
| 10,924,466 | B2 | 2/2021 | Biyani |
| 11,230,372 | B1 | 1/2022 | Griffin |
| 11,299,287 | B1 | 4/2022 | Moy et al. |
| 11,652,255 | B2 | 5/2023 | Donovan |
| 2013/0146708 | A1 | 6/2013 | Vaughan |
| 2014/0138477 | A1 | 5/2014 | Keennon |
| 2015/0012154 | A1 | 1/2015 | Senkel |
| 2016/0236790 | A1 | 8/2016 | Knapp |
| 2019/0084684 | A1 | 3/2019 | Eller |
| 2019/0233098 | A1 | 8/2019 | Tian |
| 2019/0291860 | A1 | 9/2019 | Morgan |
| 2019/0337612 | A1 | 11/2019 | Carter, Jr. |
| 2020/0232395 | A1 | 7/2020 | Chahal |
| 2020/0262544 | A1 | 8/2020 | Wilkens |
| 2020/0307774 | A1 | 10/2020 | Zingaro |
| 2020/0333805 | A1 * | 10/2020 | English .................. G05D 1/654 |
| 2021/0292009 | A1 | 9/2021 | Mangat et al. |
| 2021/0391731 | A1 | 12/2021 | Kirleis et al. |
| 2022/0009626 | A1 | 1/2022 | Baharav |
| 2022/0177123 | A1 * | 6/2022 | Hashimoto ......... B64C 29/0025 |

OTHER PUBLICATIONS

Office Action for U.S. Appl. No. 18/862,468, dated Jul. 18, 2025, 20 pages.

* cited by examiner

AIRCRAFT HAVING REVERSE THRUST CAPABILITIES

CROSS-REFERENCE TO RELATED APPLICATIONS

This application is a continuation-in-part of Non-provisional application Ser. No. 17/319,155 filed on May 13, 2021 and entitled AIRCRAFT HAVING REVERSE THRUST CAPABILITIES," the entirety of which is incorporated herein by reference.

FIELD OF THE INVENTION

The present invention generally relates to the field of electrically propelled vehicles. In particular, the present invention is directed to an aircraft having reverse thrust capabilities.

BACKGROUND

In electrically propelled vehicles, such as an electric vertical takeoff and landing (eVTOL) aircraft, a very high lift-to-drag ratio is required. In some flights, a component of the aircraft may include an aerodynamic braking or wing lift reduction that adds significant weight, complexity, and cost.

SUMMARY OF THE DISCLOSURE

An aircraft having reverse thrust capabilities is described. The aircraft includes a fuselage, a plurality of flight components configured to enable the aircraft at a low-speed flight mode, a pilot control located within the fuselage, a sensor attached to the pilot control configured to detect an aircraft datum from the pilot control, an energy source configured to provide power to the flight component, and a flight controller, located within the fuselage, wherein the flight controller is configured to receive, while the aircraft is in a low-speed flight mode, the aircraft datum from the sensor at an initial time, wherein the initial time occurs when at least a flight component of the plurality of flight components produces a positive thrust, initiate, while the aircraft is in a low-speed flight mode, a reverse thrust command as a function of the aircraft datum at a subsequent time wherein, the reverse thrust command causes the at least a flight component of the plurality of flight components to produce a negative thrust, and the subsequent time occurs temporally after the initial time and command the at least a flight component of the plurality of flight components to enter a speed reversal region.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to an aircraft having a reverse thrust capability. In an embodiment, this disclosure detects an aircraft datum from a pilot control. Aspects of the present disclosure allow for initiating a reverse torque command of a flight component of a plurality of flight components as a function of the aircraft datum. Exemplary embodiments illustrating aspects of the present disclosure are described below in the context of several specific examples.

Figure 1:
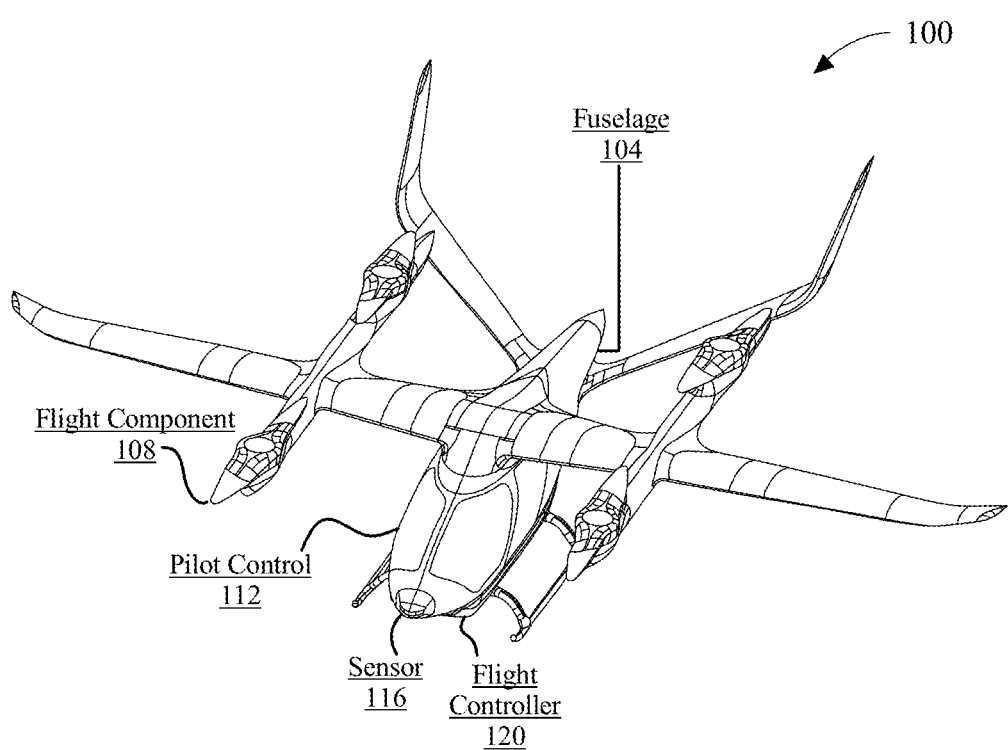
FIG. 1 is a diagrammatic representation of an exemplary embodiment of an electric aircraft.

Referring now to FIG. 1, an exemplary embodiment of an aircraft 100 having reverse thrust capabilities is illustrated. System 100 may include an electrically powered aircraft. In embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

Continuing to refer to FIG. 1, an illustration of forces is illustrated in an electric aircraft. During flight, a number of forces may act upon the electric aircraft. Forces acting on an aircraft during flight may include thrust, the forward force produced by the rotating element of the aircraft and acts parallel to the longitudinal axis. Drag may be defined as a rearward retarding force which is caused by disruption of airflow by any protruding surface of the aircraft such as, without limitation, the wing, rotor, and fuselage. Drag may oppose thrust and acts rearward parallel to the relative wind. Another force acting on aircraft may include weight, which may include a combined load of the aircraft itself, crew, baggage and fuel. Weight may pull aircraft downward due to the force of gravity. An additional force acting on aircraft may include lift, which may act to oppose the downward force of weight and may be produced by the dynamic effect of air acting on the airfoil and/or downward thrust from at least a propulsor. Lift generated by the airfoil may depends on speed of airflow, density of air, total area of an airfoil and/or segment thereof, and/or an angle of attack between air and the airfoil.

Still referring to FIG. 1, aircraft 100 includes a fuselage 104. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 104 may comprise structural elements that physically support the shape and structure of an aircraft. Structural elements may take a plurality of forms, alone or in combination with other types. Structural elements may vary depending on the construction type of aircraft and specifically, the fuselage. Fuselage 104 may comprise a truss structure. A truss structure is often used with a lightweight aircraft and comprises welded steel tube trusses. A truss, as used herein, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber, the latter of which will be addressed in greater detail later in this paper.

In embodiments, aircraft fuselage 104 may comprise geodesic construction. Geodesic structural elements may include stringers wound about formers (which may be alternatively called station frames) in opposing spiral directions. A stringer, as used herein, is a general structural element that comprises a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along the length of the interior of aircraft fuselage 104 orthogonal to the longitudinal (nose to tail) axis of the aircraft and forms the general shape of fuselage 104. A former may comprise differing cross-sectional shapes at differing locations along fuselage 104, as the former is the structural element that informs the overall shape of a fuselage 104 curvature. In embodiments, aircraft skin can be anchored to formers and strings such that the outer mold line of the volume encapsulated by the formers and stringers comprises the same shape as aircraft 100 when installed. In other words, former(s) may form a fuselage's ribs, and the stringers may form the interstitials between such ribs. The spiral orientation of stringers about formers provides uniform robustness at any point on an aircraft fuselage such that if a portion sustains damage, another portion may remain largely unaffected. Aircraft skin would be mechanically coupled to underlying stringers and formers and may interact with a fluid, such as air, to generate lift and perform maneuvers.

In an embodiment, and still referring to FIG. 1, fuselage 104 may comprise monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may comprise aircraft skin made from plywood layered in varying grain directions, epoxy-impregnated fiberglass, carbon fiber, or any combination thereof.

According to embodiments, fuselage 104 can include a semi-monocoque construction. Semi-monocoque construction, as used herein, is a partial monocoque construction, wherein a monocoque construction is describe above detail. In semi-monocoque construction, aircraft fuselage 104 may derive some structural support from stressed aircraft skin and some structural support from underlying frame structure made of structural elements. Formers or station frames can be seen running transverse to the long axis of fuselage 104 with circular cutouts which are generally used in real-world manufacturing for weight savings and for the routing of electrical harnesses and other modern on-board systems. In a semi-monocoque construction, stringers are the thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate that there are numerous methods for mechanical fastening of the aforementioned components like crews, nails, dowels, pins, anchors, adhesives like glue or epoxy, or bolts and nuts, to name a few. A subset of fuselage under the umbrella of semi-monocoque construction is unibody vehicles. Unibody, which is short for "unitized body" or alternatively "unitary construction", vehicles are characterized by a construction in which the body, floor plan, and chassis form a single structure. In the aircraft world, unibody would comprise the internal structural elements like formers and stringers are constructed in one piece, integral to the aircraft skin as well as any floor construction like a deck.

Still referring to FIG. 1, stringers and formers which account for the bulk of any aircraft structure excluding monocoque construction can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. The location of said stringers greatly informs the type of forces and loads applied to each and every stringer, all of which may be handled by material selection, cross-sectional area, and mechanical coupling methods of each member. The same assessment may be made for formers. In general, formers are significantly larger in cross-sectional area and thickness, depending on location, than stringers. Both stringers and formers may comprise aluminum, aluminum alloys, graphite epoxy composite, steel alloys, titanium, or an undisclosed material alone or in combination.

In an embodiment, and still referring to FIG. 1, stressed skin, when used in semi-monocoque construction is the concept where the skin of an aircraft bears partial, yet significant, load in the overall structural hierarchy. In other words, the internal structure, whether it be a frame of welded tubes, formers and stringers, or some combination, is not sufficiently strong enough by design to bear all loads. The concept of stressed skin is applied in monocoque and semi-monocoque construction methods of fuselage 104. Monocoque comprises only structural skin, and in that sense, aircraft skin undergoes stress by applied aerodynamic fluids imparted by the fluid. Stress as used in continuum mechanics can be described in pound-force per square inch (lbf/in$^2$) or Pascals (Pa). In semi-monocoque construction stressed skin bears part of the aerodynamic loads and additionally imparts force on the underlying structure of stringers and formers.

Still referring to FIG. 1, it should be noted that an illustrative embodiment is presented only, and this disclosure in no way limits the form or construction method of a system and method for loading payload into an eVTOL aircraft. In embodiments, fuselage 104 may be configurable based on the needs of the eVTOL per specific mission or objective. The general arrangement of components, structural elements, and hardware associated with storing and/or moving a payload may be added or removed from fuselage 104 as needed, whether it is stowed manually, automatedly, or removed by personnel altogether. Fuselage 104 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 104 may also be configurable to accept certain specific cargo containers, or a receptable that can, in turn, accept certain cargo containers.

Still referring to FIG. 1, aircraft 100 includes a plurality of flight components. As used in this disclosure a "flight component" is a component that promotes flight and guidance of an aircraft. Plurality of flight component 108 is configured to enable aircraft 100 at a low-speed flight mode. As used in this disclosure a "flight mode" is one or more operating modes aircraft 100 may perform. "Low-speed flight mode," for the purpose of this disclosure, is a flight mode of aircraft 100 at low-speed. In some embodiments, low-speed flight mode may include a low-speed threshold. As used in this disclosure, a "low-speed threshold" is a magnitude in the speed of aircraft 100 in a space that must not be exceeded in order to enable ow-speed flight mode. Aircraft 100 may be in low-speed mode if aircraft 100 is traveling in a space at a speed below low-speed threshold. Space may include any space on and/or above the ground. In a non-limiting example, low-speed threshold may include a wing stall speed of aircraft 100. As used in this disclosure, a "wing stall speed" is a minimum speed aircraft 100 can fly without stalling. Wing stall speed may be varied depending on weight, load factor, power, center of gravity location of aircraft 100. In some cases, wing stall speed may be 50 km/h (31 mph). some cases, wing stall speed may be 100 mph. In some cases, wing stall speed may be more than 100 mph. Aircraft 100 at low-speed flight mode may travel on the ground using plurality of flight components. In other embodiments, plurality of flight components may be configured to enable aircraft 100 at a high-speed flight mode. As used in this disclosure, a "high-speed flight mode" is a flight mode of aircraft 100 at high-speed. In some cases, aircraft 100 may be at high-speed flight mode if aircraft 100 is traveling in a space at a speed above low-speed threshold. In a non-limiting example, high-speed flight mode may allow aircraft 100 to travel in the air at certain altitude. Such speed of aircraft 100 at high-speed flight mode may be ranging from 150~600 mph. Such speed of aircraft 100 at high-speed flight mode may be ranging from 250~550 mph Such speed of aircraft 100 at high-speed flight mode may be ranging from 547~575 mph. Low-speed flight mode, high-speed flight mode, and their operations thereof may be described in further detail below in reference to FIGS. 3 and 4.

With continued reference to FIG. 1, in an embodiment, flight components may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. As a further non-limiting example, mechanical coupling may include one or more fastening techniques, such as but not limited to, screwing, bolting, riveting, adhesion, welding, brazing, engineered fitting, enclosure within a compartment, and the like thereof. As used in this disclosure an "aircraft" is vehicle that may fly by gaining support from the air. As a non-limiting example, aircraft may include airplanes, helicopters, airships, blimps, gliders, paramotors, and the like thereof. In an embodiment, mechanical coupling may be used to connect the ends of adjacent parts and/or objects of an electric aircraft. Further, in an embodiment, mechanical coupling may be used to join two pieces of rotating electric aircraft components.

With continued reference to FIG. 1, the plurality of flight components may be configured to produce a torque. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, plurality of flight components may include a component used to produce a torque that affects the aircrafts' roll and pitch which may comprise one or more ailerons, defined herein as hinged surfaces which form part of the trailing edge of each wing in a fixed wing aircraft, and which may be moved via mechanical means such as without limitation servomotors, mechanical linkages, or the like, to name a few. As a further example, the plurality of flight components may include a rudder, which may include, without limitation, a segmented rudder that produces a torque about a vertical axis. Additionally or alternatively, the plurality of flight components may include other flight control surfaces such as propulsors, rotating flight controls, or any other structural features which can adjust the movement of the aircraft. Plurality of flight components may include one or more rotors, turbines, ducted fans, paddle wheels, and/or other components configured to propel a vehicle through a fluid medium including, but not limited to air.

Still referring to FIG. 1, the plurality of flight components may include at least a propulsor component. As used in this disclosure a "propulsor component" is a component and/or device used to propel a craft by exerting force on a fluid medium, which may include a gaseous medium such as air or a liquid medium such as water. In an embodiment, when a propulsor twists and pulls air behind it, it will, at the same time, push an aircraft forward with an equal amount of force and/or thrust. The more air pulled behind an aircraft, the greater the thrust with which the aircraft is pushed forward. Propulsor component may include any device or component that consumes electrical power on demand to propel an electric aircraft in a direction or other vehicle while on ground or in-flight. In an embodiment, propulsor component may include a puller component. As used in this disclosure a "puller component" is a component that pulls and/or tows an aircraft through a medium. As a non-limiting example, puller component may include a flight component such as a puller propeller, a puller motor, a puller propulsor, and the like. Additionally, or alternatively, puller component may include a plurality of puller flight components. In another embodiment, propulsor component may include a pusher component. As used in this disclosure a "pusher component" is a component that pushes and/or thrusts an aircraft through a medium. As a non-limiting example, pusher component may include a pusher component such as a pusher propeller, a pusher motor, a pusher propulsor, and the like. Additionally, or alternatively, pusher flight component may include a plurality of pusher flight components.

In another embodiment, and still referring to FIG. 1, propulsor may include a propeller, a blade, or any combination of the two. The function of a propeller is to convert rotary motion from an engine or other power source into a swirling slipstream which pushes the propeller forwards or backwards. Propulsor may include a rotating power-driven hub, to which are attached several radial airfoil-section blades such that the whole assembly rotates about a longitudinal axis. As a non-limiting example, the blade pitch of the propellers may be fixed at a fixed angle, manually variable to a few set positions, automatically variable (e.g. a "constant-speed" type), and/or any combination thereof as described further above. As used in this disclosure a "fixed angle" is an angle that is secured and/or unmovable from the attachment point. For example, and without limitation, a fixed angle may be an angle of 2.2° inward and/or 1.7° forward. As a further non-limiting example, a fixed angle may be an angle of 3.6° outward and/or 2.7° backward. In an embodiment, propellers for an aircraft are designed to be fixed to their hub at an angle similar to the thread on a screw makes an angle to the shaft; this angle may be referred to as a pitch or pitch angle which will determine the speed of the forward movement as the blade rotates. Additionally or alternatively, propulsor component may be configured at a variable pitch angle. As used in this disclosure a "variable pitch angle" is an angle that may be moved and/or rotated. For example, and without limitation, propulsor component may be angled at a first angle of 3.3° inward, wherein propulsor component may be rotated and/or shifted to a second angle of 1.7° outward.

Still referring to FIG. 1, propulsor may include a thrust element which may be integrated into the propulsor. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

With continued reference to FIG. 1, plurality of flight components may include power sources, control links to one or more elements, fuses, and/or mechanical couplings used to drive and/or control any other flight component. Plurality of flight components may include a motor that operates to move one or more flight control components, to drive one or more propulsors, or the like. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking. In an embodiment, plurality of flight components may include an inverter. As used in this disclosure an "inverter" is a device that changes one or more currents of a system. For example, and without limitation, inverter may include one or more electronic devices that change direct current to alternating current. As a further non-limiting example, inverter may include receiving a first input voltage and outputting a second voltage, wherein the second voltage is different from the first voltage. In an embodiment, and without limitation, inverter may output a waveform, wherein a waveform may comprise a square wave, sine wave, modified sine wave, near sine wave, and the like thereof.

Still referring to FIG. 1, plurality of flight components may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which system 100 may be incorporated.

In an embodiment, and still referring to FIG. 1, an energy source may be used to provide a steady supply of electrical power to a load over the course of a flight by a vehicle or other electric aircraft. For example, the energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, the energy source may be capable of providing sufficient electrical power for auxiliary loads including without limitation, lighting, navigation, communications, de-icing, steering or other systems requiring power or energy. Further, the energy source may be capable of providing sufficient power for controlled descent and landing protocols, including, without limitation, hovering descent or runway landing. As used herein the energy source may have high power density where the electrical power an energy source can usefully produce per unit of volume and/or mass is relatively high. The electrical power is defined as the rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 1, an energy source may include a plurality of energy sources, referred to herein as a module of energy sources. The module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of at least an energy source may be based on the individual battery cell performance or an extrapolation based on the measurement of at least an electrical parameter. In an embodiment where the energy source includes a plurality of battery cells, the overall power output capacity may be dependent on the electrical parameters of each individual cell. If one cell experiences high self-discharge during demand, power drawn from at least an energy source may be decreased to avoid damage to the weakest cell. The energy source may further include, without limitation, wiring, conduit, housing, cooling system and battery management system. Persons skilled in the art will be aware, after reviewing the entirety of this disclosure, of many different components of an energy source. Exemplary energy sources are disclosed in detail in U.S. patent application Ser. Nos. 16/948,157 and 16/048,140 both entitled "SYSTEM AND METHOD FOR HIGH ENERGY DENSITY BATTERY MODULE" by S. Donovan et al., which are incorporated in their entirety herein by reference.

Still referring to FIG. 1, according to some embodiments, an energy source may include an emergency power unit (EPU) (i.e., auxiliary power unit). As used in this disclosure an "emergency power unit" is an energy source as described herein that is configured to power an essential system for a critical function in an emergency, for instance without limitation when another energy source has failed, is depleted, or is otherwise unavailable. Exemplary non-limiting essential systems include navigation systems, such as MFD, GPS, VOR receiver or directional gyro, and other essential flight components, such as propulsors.

Still referring to FIG. 1, another exemplary flight component may include landing gear. Landing gear may be used for take-off and/or landing/Landing gear may be used to contact ground while aircraft 100 is not in flight. Exemplary landing gear is disclosed in detail in U.S. patent application Ser. No. 17/196,719 entitled "SYSTEM FOR ROLLING LANDING GEAR" by R. Griffin et al., which is incorporated in its entirety herein by reference.

Still referring to FIG. 1, aircraft 100 includes a pilot control 112 located within fuselage 104. As used in this disclosure a "pilot control" is a mechanical and/or manually operated flight control system. For example, and without limitation pilot control 112 may include a collective control. As used in this disclosure a "collective control" is a mechanical control of an aircraft that allows a pilot to adjust and/or control the pitch angle of the plurality of flight components. For example and without limitation, collective control may alter and/or adjust the pitch angle of all of the main rotor blades collectively. For example, and without limitation pilot control 112 may include a yoke control. As used in this disclosure a "yoke control" is a mechanical control of an aircraft to control the pitch and/or roll. For example and without limitation, yoke control may alter and/or adjust the roll angle of aircraft 100 as a function of controlling and/or maneuvering ailerons. In an embodiment, pilot control 112 may include one or more foot brakes, control sticks, pedals, throttle levels, and the like thereof. In another embodiment, and without limitation, pilot control 112 may be configured to control a principal axis of the aircraft. As used in this disclosure a "principal axis" is an axis in a body representing a three-dimensional orientation. For example, and without limitation, principal axis may include a yaw, pitch, and/or roll axis. As used in this disclosure a "yaw axis" is an axis that is directed towards the bottom of the aircraft, perpendicular to the wings. For example, and without limitation, a positive yawing motion may include adjusting and/or shifting the nose of aircraft 100 to the right. As used in this disclosure a "pitch axis" is an axis that is directed towards the right laterally extending wing of the aircraft. For example, and without limitation, a positive pitching motion may include adjusting and/or shifting the nose of aircraft 100 upwards. As used in this disclosure a "roll axis" is an axis that is directed longitudinally towards the nose of the aircraft, parallel to the fuselage.

For example, and without limitation, a positive rolling motion may include lifting the left and lowering the right wing concurrently.

Still referring to FIG. 1, pilot control 112 may be configured to modify the variable pitch angle. For example, and without limitation, pilot control 112 may adjust one or more angles of attack of a propeller. As used in this disclosure an "angle of attack" is an angle between the chord of the propeller and the relative wind. For example, and without limitation angle of attack may include a propeller blade angled 3.2°. In an embodiment, pilot control 112 may modify the variable pitch angle as a function of one or more actuators, servo motors, stepper motors, and the like thereof. For example, and without limitation, pilot control 112 may modify the variable pitch angle from a first angle of 2.71° to a second angle of 3.82° as a function of a linear actuator. Additionally or alternatively, pilot control 112 may be configured to translate a pilot desired torque for flight component, wherein a pilot desired torque is a measurable value of force exerted on the flight component that the pilot wishes and/or wants. For example, and without limitation, pilot control 112 may translate that a pilot's desired torque for a propeller be 160 lb. ft. of torque. As a further non-limiting example, pilot control 112 may translate that a pilot's desired torque for a propulsor be 290 lb. ft. of torque.

Still referring to FIG. 1, aircraft 100 includes a sensor 116 attached to pilot control. Sensor 116 is configured to detect an aircraft datum from pilot control. As used in this disclosure a "sensor" is a device, module, and/or subsystem, utilizing any hardware, software, and/or any combination thereof to detect events and/or changes in the instant environment and transmit the information. Sensor 116 may be attached via a mechanically and/or communicatively coupled, as described above, to aircraft 100. Sensor 116 is configured to detect an aircraft datum from the pilot control. As used in this disclosure an "aircraft datum" is datum representing one or more conditions of aircraft 100. For example and without limitation, aircraft datum may include datum representing one or more conditions of the energy source and/or motor. One or more conditions may include, without limitation, voltage levels, electromotive force, current levels, temperature, current speed of rotation, and the like. Sensor may further include detecting electrical parameters. Electrical parameters may include, without limitation, voltage, current, ohmic resistance of a flight component. Sensor 116 may include one or more environmental sensors, which may function to sense parameters of the environment surrounding the aircraft. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor 116 may include at least a geospatial sensor. Sensor 116 may be located inside an aircraft; and/or be included in and/or attached to at least a portion of the aircraft. Sensor may include one or more proximity sensors, displacement sensors, vibration sensors, and the like thereof. Sensor may be used to monitor the status of aircraft 100 for both critical and non-critical functions. Sensor may be incorporated into vehicle or aircraft or be remote.

Still referring to FIG. 1, aircraft 100 includes a flight controller 120 located within fuselage 104. As used in this disclosure a "flight controller" is a computing device of a plurality of computing devices dedicated to data storage, security, distribution of traffic for load balancing, and flight instruction. In an embodiment and without limitation, flight controller 120 is configured to receive aircraft datum from sensor 116 at an initial time, wherein the initial time occurs when at least a flight component of the plurality of flight components produces a positive thrust at low-speed flight mode. In some embodiments, at least a flight component may include propulsor component as described above. A "positive thrust," as described herein, is a thrust in a forward thrust direction. As used in this disclosure a "forward thrust direction" is a first direction of thrust that propels aircraft 100 in a forward direction as a function of a flight component. Initial time may include any time aircraft 100 is traveling in a same direction as the forward thrust direction, regardless of the speed of which aircraft 100 is traveling. In a non-limiting example, initial time may include a time while aircraft 100 is cruising, taking off, and the like thereof. For example, and without limitation, flight controller 120 may receive one or more aircraft data representing barometric pressures of aircraft 100. As a further non-limiting example, flight controller 120 may receive one or more aircraft data representing propeller torque forces. As a further non-limiting example, flight controller 120 may receive one or more aircraft data representing thrust forces. As a further non-limiting example, flight controller 120 may receive one or more aircraft data representing air speed velocities. As a further non-limiting example, flight controller 120 may receive one or more aircraft datum representing pitch angles. As a further non-limiting example, flight controller 120 may receive one or more aircraft datum representing power source voltages. As a further non-limiting example, flight controller 120 may receive one or more aircraft datum representing flight path distances and/or remaining distances to travel.

With continued reference to FIG. 1, in an embodiment and still referring to FIG. 1, flight controller 120 is configured to initiate a reverse thrust command as a function of aircraft datum at a subsequent time, wherein the reverse thrust command causes at least a flight component 108 of the plurality of flight components to produce a negative thrust at low-speed flight mode, and the subsequent time occurs temporally after the initial time. As used in this disclosure a "reverse thrust command" is a command directing a flight component to reduce and/or reverse a first thrust. As used in this disclosure, a "negative thrust" is a thrust in an opposite direction to forward thrust direction as described above. Subsequent time may include any time aircraft 100 is currently traveling or intend to travel in the opposite direction to forward thrust direction according to reverse thrust command initiated by flight controller 120 based on aircraft datum. For instance, and without limitation, subsequent time may include a time when aircraft 100 is slowing down, landing, reversing, and the like thereof. For example, and without limitation, forward thrust direction may include a longitudinal direction directed towards the nose of aircraft 100. Reverse thrust command may be configured to generate a thrust in a longitudinal direction directed towards the tail of aircraft 100. In an embodiment, and without limitation, reverse thrust command may include a command that directs a propulsor with a first thrust of 90 N in a forward direction to reverse thrust towards a backward direction with a thrust of 20 N. In another embodiment, and without limitation, reverse thrust command may be transmitted to at least a power source, wherein a power source is described above. For example, and without limitation, reverse thrust command may be transmitted to at least a motor that is rotating in a first clockwise direction, wherein the motor is adjusted to rotate in a second counter-clockwise direction.

With continued reference to FIG. 1, flight controller 120 may be configured to initiate a reverse torque command of at least a flight component 108 of the plurality of flight components as a function of aircraft datum. As used in this disclosure a "reverse torque command" is a command directing a flight component to reduce and/or reverse a first torque magnitude and/or direction. As a non-limiting example, reverse torque command may command a propeller that has a first torque of 9 Nm in a clockwise direction to reduce the torque to 2 Nm in the same clockwise direction. As a further non-limiting example, reverse torque command may command a rotor that has a first torque of 7 Nm in a clockwise direction to reverse the torque direction to counterclockwise with a torque of 3 Nm.

In an embodiment and without limitation, sensor 116 may be configured to detect reverse torque command. For example and without limitation, sensor 116 may detect that flight controller 120 transmitted a reverse torque command to a propeller. As a further non-limiting example, sensor 116 may detect that flight controller 120 transmitted a reverse torque command to a brushless motor. In an embodiment, sensor 116 may detect reverse torque command by indicating a magnitude of reverse torque applied to at least a flight component 108. For example, and without limitation, sensor may detect a magnitude of 7 N of reverse toque applied to a propulsor. As a further non-limiting example, sensor may detect a magnitude of 3 N of reverse toque applied to a rotor. In an embodiment, and without limitation initiating the reverse torque command includes applying a negative torque to the propulsor component, wherein a negative torque is a torque exerted in the opposite direction of the original torque. For example, and without limitation, reverse toque command may include applying a −2 N torque to a rotor. As a further non-limiting example, reverse torque command may include applying a −8 N torque to a propeller.

Still referring to FIG. 1, initiating reverse torque command may include inducing an aerodynamic drag. As used in this disclosure an "aerodynamic drag" is a force acting opposite to the relative motion of aircraft 100. For example, and without limitation, aerodynamic drag may include an air resistance, friction, fluid resistance, and the like thereof. In an embodiment aerodynamic drag may be relative for a velocity. For example, and without limitation, aerodynamic drag may increase proportional to the velocity for laminar flow. As a further non-limiting example, aerodynamic drag may increase proportional the squared velocity for turbulent flow. As a further non-limiting example, aerodynamic drag may include one or more parasitic drags, such as form drag, skin friction drag, and the like thereof, lift-induced drag, wave drag, wave resistance, and the like thereof. In an embodiment, and without limitation, inducing aerodynamic drag may include moving at least a flight component 108 into a reverse thrust mode. As used in this disclosure a "reverse thrust mode" is a mode and/or setting denoting that a flight component is producing a reverse thrust. For example, and without limitation, reverse thrust mode may include a rotor that is producing a reverse thrust. As a further non-limiting example, reverse thrust mode may include a propeller that is operating in reverse thrust. In an embodiment, inducing aerodynamic drag may include recuperating aerodynamic energy. As used in this disclosure an "aerodynamic energy" is an energy and/or source of power that is generated as a function of aerodynamics. For example, and without limitation, aerodynamic energy may include energy produced as a function charging a battery as a result of aerodynamics. In an embodiment recuperating aerodynamic energy may include reaching a reverse thrust level. As used in this disclosure a reverse thrust level is maximum level of aerodynamic energy that may be recuperated before operating conditions of aircraft 100 become unsafe. For example, and without limitation, reverse thrust level may identify that a maximum of 13 kJ of aerodynamic energy may be recuperated prior to the aircraft operating unsafely. As a further non-limiting example, reverse thrust level may identify that a maximum of 6 kJ of aerodynamic energy may be recuperated prior to the aircraft operating unsafely.

In an embodiment, and still referring to FIG. 1, inducing aerodynamic drag may include moving at least a flight component 108 into a reverse speed mode. As used in this disclosure a "reverse speed mode" is a mode and/or setting denoting that a flight component is rotating and/or moving at a rate, wherein the rotation and/or movement is opposite to a first rotation and/or movement. For example, and without limitation, reverse speed mode may include a propeller that rotates around a shaft at 8,000 revolutions per minute in a clockwise direction. In an embodiment inducing aerodynamic drag may further comprise dissipating a forward momentum by pushing air against at least a flight component 108. For example, and without limitation, a propeller may act as a large disk of drag by pushing air against the forward motion of aircraft 100. As used in this disclosure a "forward momentum" is a quantity of motion of aircraft 100 measured as a product of its mass and velocity. For example, and without limitation, aircraft 100 may include a forward momentum of 100 kgm/s. As a further non-limiting example, aircraft 100 may include a forward momentum of 8,000 kgm/s. In an embodiment, and without limitation, dissipating forward momentum by pushing air against at least a flight component 108 may act as one or more braking mechanisms. As used in this disclosure a "braking mechanism" is a mechanical and/or electrical device that inhibits forward motion by producing energy opposite to forward momentum. As a non-limiting example, braking mechanism may include aircraft disc brakes, thrust reverses, air brakes, large drogue parachutes, and the like thereof. Braking mechanism may generate an aerodynamic drag to slow down the aircraft.

In an embodiment and still referring to FIG. 1, aircraft 100 may be include an electric short take-off and landing (eSTOL) vehicle. As used in this disclosure an "electric short take-off and landing (eSTOL) vehicle" is a vehicle that is capable of taking off and/or landing within 100 m. For example, and without limitation, aircraft 100 may include initiating reverse torque command to increase aerodynamic drag and reduce aircraft speed, wherein reducing aircraft speed may allow for landing within 100 m. As a further non-limiting example, aircraft 100 may include initiating reverse torque command to increase reverse thrust of a propeller and reduce aircraft speed, wherein reducing aircraft speed may allow for landing within 300 m.

Figure 2:
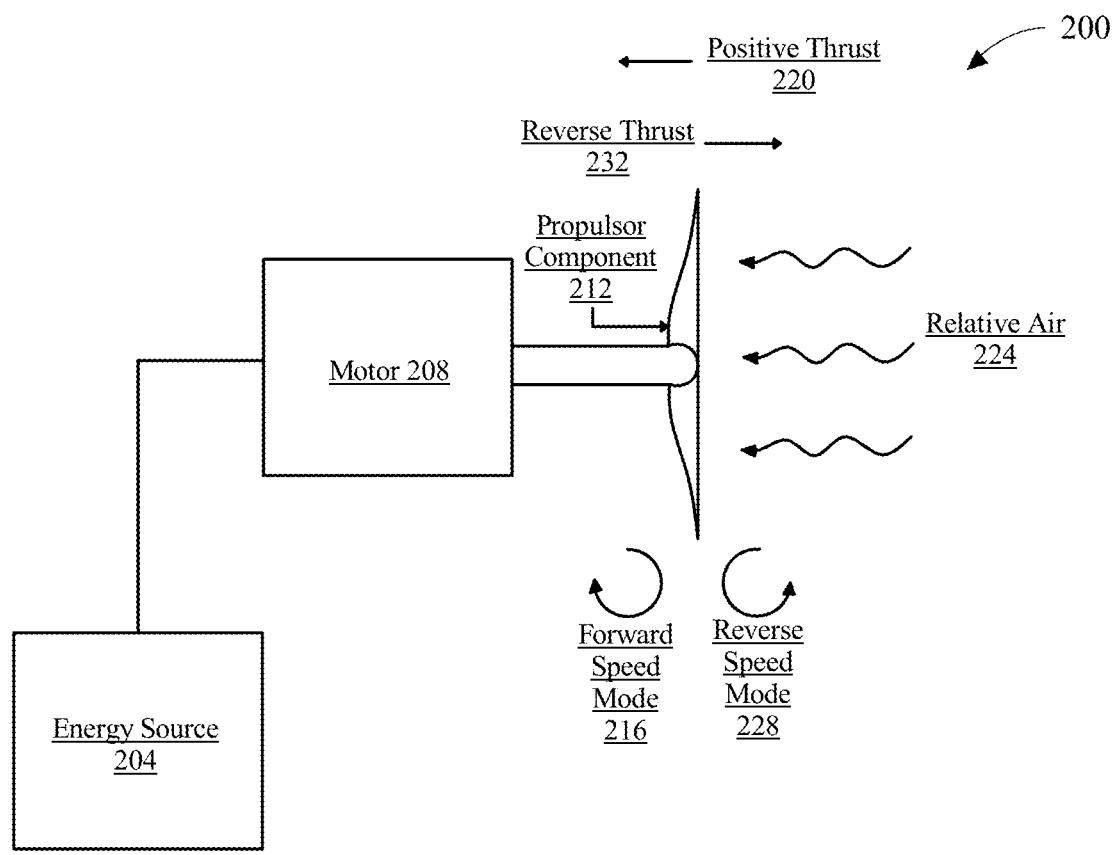
FIG. 2 is a diagrammatic representation of an exemplary embodiment of a reverse thrust command.

Now referring to FIG. 2, an exemplary embodiment 200 of aircraft 100 performing a reverse thrust command is illustrated. Reverse thrust command includes any of the reverse thrust command as described above, in reference to FIG. 1. Aircraft 100 may include an energy source 204. An energy source 204 may include any of energy source 204 as described above, in reference to FIG. 1. Energy source 204 may be configured to provide energy and/or power to a motor 208. Motor 208 may include any of the motor 208 as described above, in reference to FIG. 1. Motor 208 may be mechanically coupled and/or secured to a propulsor component 212. Propulsor component 212 may include any of the propulsor component as described above, in reference to FIG. 1. In some embodiments, at least a flight component 108 of plurality of flight components may be configured to operate in a forward speed mode at initial time. As used in this disclosure a "forward speed mode" is a mode and/or setting denoting that a flight component is rotating and/or moving at a rate in a first direction. In a non-limiting example, motor 208 may command propulsor component 212 to operate in a forward speed mode 216. Propulsor component 212 operates in forward speed mode 126 may include a propeller that rotates around a shaft at 6,000 revolutions per minute in a clockwise direction. Forward speed mode 216 may generate a positive thrust 220. Positive thrust may include any positive thrust described in this disclosure. As used in this disclosure a "forward thrust" is a thrust that forces an aircraft through a medium, such as a relative air surrounding aircraft 100. For example, forward thrust may include a thrust of 111 N directed towards the rear of an aircraft to at least force aircraft to be propelled forward. As used in this disclosure a "relative air" is an external medium that surrounds aircraft 100. Additionally of alternatively, at least a flight component 108 of the plurality of flight components may be configured to operate in a reverse speed mode based on the reverse thrust command at subsequent time. As used in this disclosure a "reverse speed mode" is a mode and/or setting denoting that a flight component is rotating and/or moving at a rate in an opposite direction top the first direction. In a non-limiting example, motor 208 may command propulsor component 212 to operate in a reverse speed mode, wherein the propulsor component 212 operate in the reverse speed mode may include a propeller that rotates around a shaft at 2,000 revolutions per minute in a counterclockwise direction. Reverse speed mode 228 may generate a reverse thrust 232. As used in this disclosure a "reverse thrust" is a thrust that forces a medium towards the relative air opposing aircraft 100. In some embodiments, reverse thrust 232 may include negative thrust as described above in this disclosure. For example, and without limitation, reverse thrust 232 may include a thrust of 180 N directed towards the nose of aircraft 100 to at least repel and/or oppose relative air 224.

Figure 3:
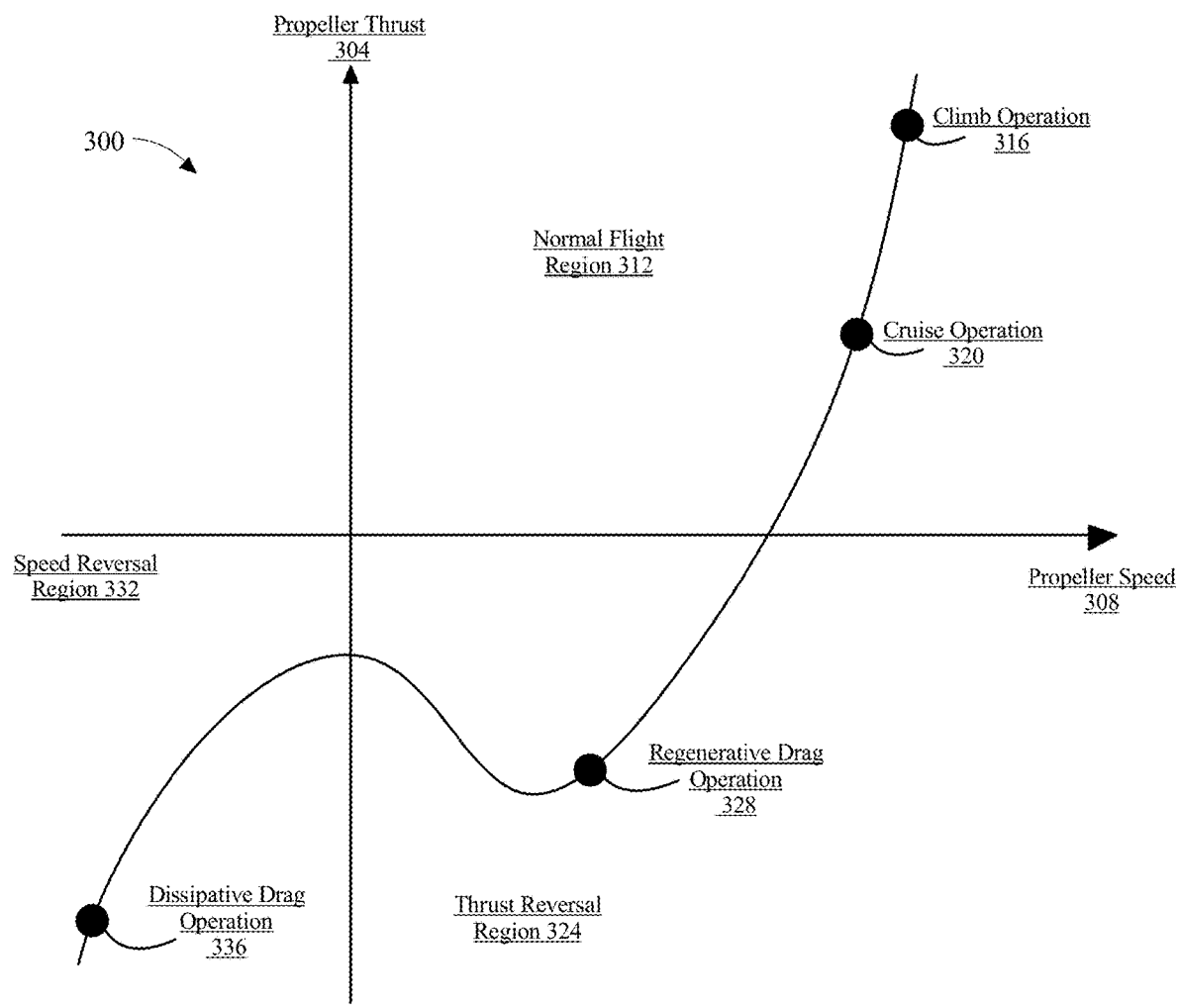
FIG. 3 is a diagrammatic representation of an exemplary embodiment of a high-speed flight mode.

Now referring to FIG. 3, an exemplary embodiment 300 of a high-speed flight mode is illustrated. In an embodiment and without limitation, flight mode may be determined as a function of a propeller thrust 304. As used in this disclosure a "propeller thrust" is the force generated by a propeller. For example, propeller thrust may include a forward thrust and/or reverse thrust as described in detail above, in reference to FIG. 1-2. Additionally or alternatively, flight mode may include a propeller speed 308. As used in this disclosure a "propeller speed" is the rate at which a propeller rotates about a longitudinal axis. For example, propeller speed may include a forward speed mode and/or reverse speed mode as described in detail above, in reference to FIGS. 1-2. In an embodiment and without limitation, flight mode may include a normal flight region 312. As used in this disclosure a "normal flight region" is a region wherein propeller thrust and propeller speed are both positive values. Normal flight region 312 of high-speed flight mode may include one or more climb operations 316. As used in this disclosure a "climb operation" is an operating condition of aircraft 100, wherein the aircraft is elevating in altitude. For example, and without limitation, climb operation 316 may include an operating condition wherein the propeller speed and propeller thrust are both elevated. Normal flight region 312 of high-speed flight mode may include one or more cruise operations 320. As used in this disclosure a "cruise operation" is an operating condition of aircraft 100, wherein the aircraft is maintaining a steady altitude and/or propeller thrust 304. For example, and without limitation, cruise operation 320 may include an operating condition wherein the propeller speed is elevated and the propeller thrust is stabilized to allow aircraft 100 to maintain a steady flight path without increasing and/or decreasing the aircraft speed.

In an embodiment, and still referring to FIG. 3, flight mode may include a thrust reversal region 324. As used in this disclosure a "thrust reversal region" is a region wherein propeller thrust is negative and/or reversed and propeller speed is positive. As a non-limiting example, at least a flight component 108 of plurality of flight components may be configured to enter thrust reversal region by flight controller 120 based on reverse thrust command at subsequent time, as described above in reference to FIGS. 1 and 2. Thrust reversal region 324 of high-speed flight mode may include one or more regenerative drag operations 328. As used in this disclosure a "regenerative drag operation" is an operating condition of aircraft 100, wherein the aircraft has a negative thrust and/or is reducing in airspeed velocity. For example, and without limitation, regenerative drag operation 328 may include a positive propeller speed and a negative propeller thrust. In an embodiment, and without limitation, flight mode may include a speed reversal region 332. As used in this disclosure a "speed reversal region" is a region wherein propeller thrust, and propeller speed is negative. Speed reversal region 332 of high-speed flight mode may include one or more dissipative drag operations 336. As used in this disclosure a "dissipative drag operation" is an operating condition of aircraft 100, wherein the aircraft has a negative thrust and a negative propeller speed. In an embodiment, and without limitation, dissipative drag operation may include one or more operating conditions that result in a braking mechanism, wherein a braking mechanism is described in detail above in reference to FIGS. 1-2.

Figure 4:
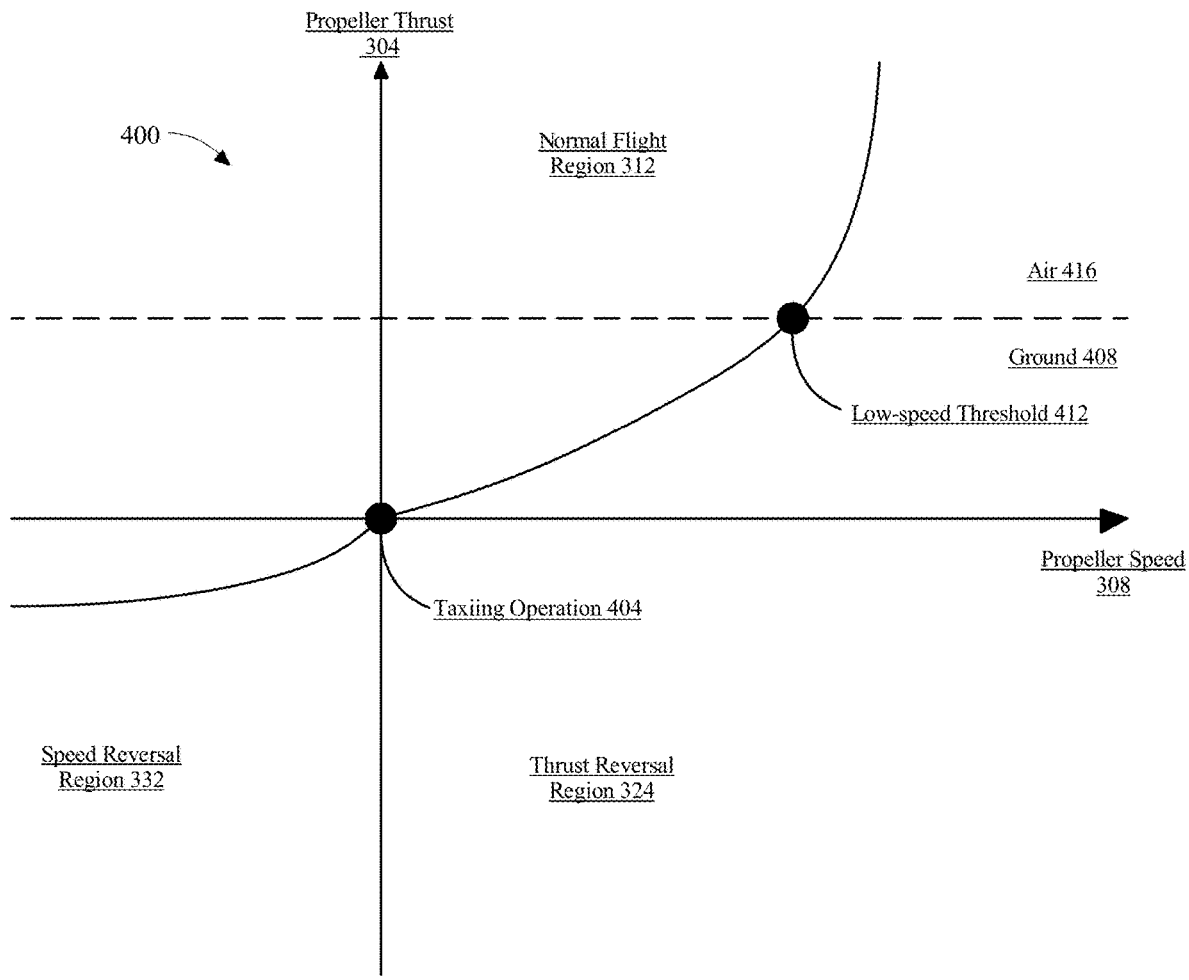
FIG. 4 is a diagrammatic representation of an exemplary embodiment of a low-speed flight mode.

Now referring to FIG. 4, an exemplary embodiment 400 of a low-speed flight mode is illustrated. In an embodiment and without limitation, aircraft 100 operate in low-speed flight mode may include a taxiing operation 404. As used in this disclosure, a "taxiing operation" is an operating condition of aircraft 100, wherein the aircraft is moving on a ground 408 under its own power. Power may be provided by any power source described in this disclosure. In an embodiment, taxiing operation 404 may be in normal flight region 312. In such embodiments, aircraft 100 may move and/or accelerate in a forward direction on ground 408 during takeoff. Taxiing operation 404 may persist before the ground speed of aircraft reaches low-speed threshold 412. Low-speed threshold 412 may include any low-speed threshold described in this disclosure. If ground speed of aircraft 100 exceeds low-speed threshold 412, aircraft 100 may then switch from low-speed flight mode to high-speed flight mode as described above; for instance, aircraft 100 may leave ground 404 and enter (i.e., fly) into air 416. Aircraft 100 may then perform one or more operations in high-speed flight mode such as, without limitation, climb operation, cruise operation, and the like thereof. In another embodiments, taxiing operation 404 may be in thrust reversal region 324. In such embodiments, aircraft 100 may move at a reduced speed and/or decelerate on ground 408 after landing with negative propeller speed and positive propeller thrust. In a further embodiment, taxiing operation 404 may be in speed reversal region 332. In such embodiment, taxing operation 404 may reverse/moving backward with negative propeller speed and propeller thrust.

Figure 5:
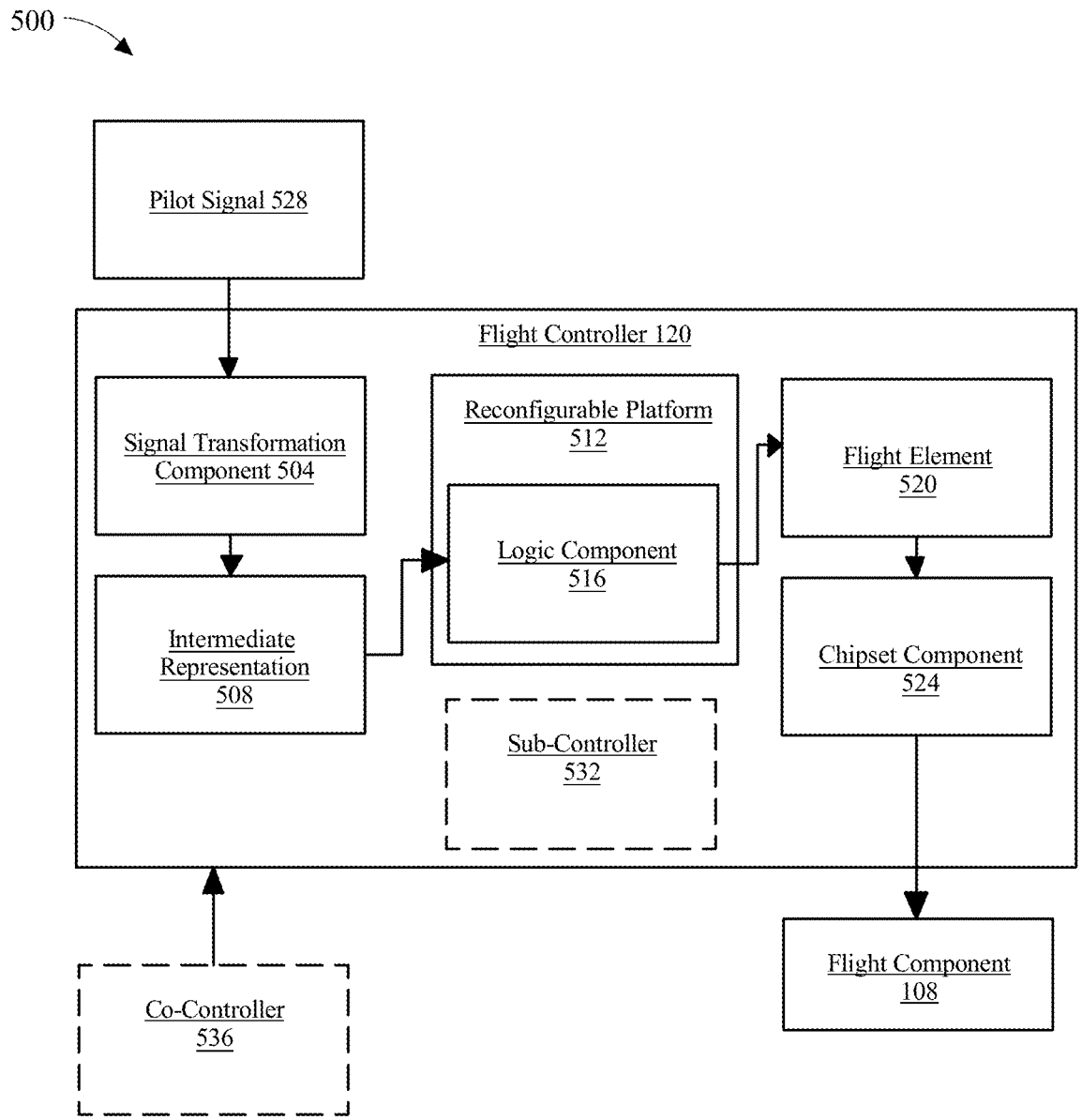
FIG. 5 is a block diagram of an exemplary embodiment of a flight controller.

Now referring to FIG. 5, an exemplary embodiment 500 of flight controller 120 is illustrated. Flight controller 124 may include and/or communicate with any computing device as described in this disclosure, including without limitation a microcontroller, microprocessor, digital signal processor (DSP) and/or system on a chip (SoC) as described in this disclosure. Further, flight controller 124 may include a single computing device operating independently, or may include two or more computing device operating in concert, in parallel, sequentially or the like; two or more computing devices may be included together in a single computing device or in two or more computing devices. In embodiments, flight controller 124 may be installed in an aircraft, may control the aircraft remotely, and/or may include an element installed in the aircraft and a remote element in communication therewith.

In an embodiment, and still referring to FIG. 5, flight controller 124 includes a signal transformation component 504. As used in this disclosure a "signal transformation component" is a component that transforms and/or converts a first signal to a second signal, wherein a signal may include one or more digital and/or analog signals. For example, and without limitation, signal transformation component 504 may be configured to perform one or more operations such as preprocessing, lexical analysis, parsing, semantic analysis, and the like thereof. In an embodiment, and without limitation, signal transformation component 504 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 504 may include transforming one or more low-level languages such as, but not limited to, machine languages and/or assembly languages. For example, and without limitation, signal transformation component 504 may include transforming a binary language signal to an assembly language signal. In an embodiment, and without limitation, signal transformation component 504 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 5, signal transformation component 504 is configured to optimize an intermediate representation 508. As used in this disclosure an "intermediate representation" is a data structure and/or code that represents the input signal. Signal transformation component 504 may optimize intermediate representation as a function of a data-flow analysis, dependence analysis, alias analysis, pointer analysis, escape analysis, and the like thereof. In an embodiment, and without limitation, signal transformation component 504 may optimize intermediate representation 508 as a function of one or more inline expansions, dead code eliminations, constant propagation, loop transformations, and/or automatic parallelization functions. In another embodiment, signal transformation component 504 may optimize intermediate representation as a function of a machine dependent optimization such as a peephole optimization, wherein a peephole optimization may rewrite short sequences of code into more efficient sequences of code. Signal transformation component 504 may optimize intermediate representation to generate an output language, wherein an "output language," as used herein, is the native machine language of flight controller 124. For example, and without limitation, native machine language may include one or more binary and/or numerical languages.

In an embodiment, and without limitation, signal transformation component 504 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 5, flight controller 124 may include a reconfigurable hardware platform 512. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 512 may be reconfigured to enact any algorithm and/or algorithm selection process received from another computing device and/or created using machine-learning processes.

Still referring to FIG. 5, reconfigurable hardware platform 512 may include a logic component 516. As used in this disclosure a "logic component" is a component that executes instructions on output language. For example, and without limitation, logic component may perform basic arithmetic, logic, controlling, input/output operations, and the like thereof. Logic component 516 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 516 may be organized according to Von Neumann and/or Harvard architecture as a non-limiting example. Logic component 516 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 516 may include one or more integrated circuit microprocessors, which may contain one or more central processing units, central processors, and/or main processors, on a single metal-oxide-semiconductor chip. Logic component 516 may be configured to execute a sequence of stored instructions to be performed on the output language and/or intermediate representation 508. Logic component 516 may be configured to fetch and/or retrieve the instruction from a memory cache, wherein a "memory cache," as used in this disclosure, is a stored instruction set on flight controller 124. Logic component 516 may be configured to decode the instruction retrieved from the memory cache to opcodes and/or operands. Logic component 516 may be configured to execute the instruction on intermediate representation 508 and/or output language. For example, and without limitation, logic component 516 may be configured to execute an addition operation on intermediate representation 508 and/or output language.

In an embodiment, and without limitation, logic component 516 may be configured to calculate a flight element 520. As used in this disclosure a "flight element" is an element of datum denoting a relative status of aircraft 500. For example, and without limitation, flight element 520 may denote one or more torques, thrusts, airspeed velocities, forces, altitudes, groundspeed velocities, directions during flight, directions facing, forces, orientations, and the like thereof. For example, and without limitation, flight element 520 may denote that aircraft 500 is cruising at an altitude and/or with a sufficient magnitude of forward thrust. As a further non-limiting example, flight status may denote that 500 is building thrust and/or groundspeed velocity in preparation for a takeoff. As a further non-limiting example, flight element 520 may denote that aircraft 500 is following a flight path accurately and/or sufficiently.

Still referring to FIG. 5, flight controller 124 may include a chipset component 524. As used in this disclosure a "chipset component" is a component that manages data flow. In an embodiment, and without limitation, chipset component 524 may include a northbridge data flow path, wherein the northbridge dataflow path may manage data flow from logic component 516 to a high-speed device and/or component, such as a RAM, graphics controller, and the like thereof. In another embodiment, and without limitation, chipset component 524 may include a southbridge data flow path, wherein the southbridge dataflow path may manage data flow from logic component 516 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 524 may manage data flow between logic component 516, memory cache, and at least a flight component 108. In an embodiment, chipset component 524 may be configured to communicate with a plurality of flight components as a function of flight element 520. For example, and without limitation, chipset component 524 may transmit to an aircraft rotor to reduce torque of a first lift propulsor and increase the forward thrust produced by a pusher component to perform a flight maneuver.

In an embodiment, and still referring to FIG. 5, flight controller 124 may be configured generate an autonomous function. As used in this disclosure an "autonomous function" is a mode and/or function of flight controller 124 that controls aircraft 500 automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 520. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft 500 and/or the maneuvers of aircraft 500 in its entirety.

In an embodiment, and still referring to FIG. 5, flight controller 124 may generate autonomous function as a function of an autonomous machine-learning model. As used in this disclosure an "autonomous machine-learning model" is a machine-learning model to produce an autonomous function output given flight element 520 and a pilot signal 528 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 528 may denote that a pilot is controlling and/or maneuvering ailerons, wherein the pilot is not in control of the rudders and/or propulsors. In an embodiment, pilot signal 528 may include an implicit signal and/or an explicit signal. For example, and without limitation, pilot signal 528 may include an explicit signal, wherein the pilot explicitly states there is a lack of control and/or desire for autonomous function. As a further non-limiting example, pilot signal 528 may include an explicit signal directing flight controller 124 to control and/or maintain a portion of aircraft 500, a portion of the flight plan, the entire aircraft, and/or the entire flight plan. As a further non-limiting example, pilot signal 528 may include an implicit signal, wherein flight controller 124 detects a lack of control such as by a malfunction, torque alteration, flight path deviation, and the like thereof. In an embodiment, and without limitation, pilot signal 528 may include one or more explicit signals to reduce torque, and/or one or more implicit signals that torque may be reduced due to reduction of airspeed velocity. In an embodiment, and without limitation, pilot signal 528 may include one or more local and/or global signals. For example, and without limitation, pilot signal 528 may include a local signal that is transmitted by a pilot and/or crew member. As a further non-limiting example, pilot signal 528 may include a global signal that is transmitted by air traffic control and/or one or more remote users that are in communication with the pilot of aircraft 500. In an embodiment, pilot signal 528 may be received as a function of a tri-state bus and/or multiplexor that denotes an explicit pilot signal should be transmitted prior to any implicit or global pilot signal.

Still referring to FIG. 5, autonomous machine-learning model may include one or more autonomous machine-learning processes such as supervised, unsupervised, or reinforcement machine-learning processes that flight controller 124 and/or a remote device may or may not use in the generation of autonomous function. As used in this disclosure "remote device" is an external device to flight controller 124. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 5, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 124 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 5, flight controller 124 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 124. Remote device and/or FPGA may transmit a signal, bit, datum, or parameter to flight controller 124 that at least relates to autonomous function. Additionally or alternatively, the remote device and/or FPGA may provide an updated machine-learning model. For example, and without limitation, an updated machine-learning model may be comprised of a firmware update, a software update, a autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 124 as a software update, firmware update, or corrected habit machine-learning model. For example, and without limitation autonomous machine learning model may utilize a neural net machine-learning process, wherein the updated machine-learning model may incorporate a gradient boosting machine-learning process.

Still referring to FIG. 5, flight controller 124 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 5, flight controller 124 may include, but is not limited to, for example, a cluster of flight controllers in a first location and a second flight controller or cluster of flight controllers in a second location. Flight controller 124 may include one or more flight controllers dedicated to data storage, security, distribution of traffic for load balancing, and the like. Flight controller 124 may be configured to distribute one or more computing tasks as described below across a plurality of flight controllers, which may operate in parallel, in series, redundantly, or in any other manner used for distribution of tasks or memory between computing devices. For example, and without limitation, flight controller 124 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 5, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 108. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 5, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 124. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 508 and/or output language from logic component 516, wherein output language may include one or more analog-to-digital conversions, low bit rate transmissions, message encryptions, digital signals, binary signals, logic signals, analog signals, and the like thereof described above in detail.

Still referring to FIG. 5, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 5, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 5, flight controller 124 may also be implemented using a "shared nothing" architecture in which data is cached at the worker, in an embodiment, this may enable scalability of aircraft 100 and/or computing device. Flight controller 124 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 5, flight controller may include a sub-controller 532. As used in this disclosure a "sub-controller" is a controller and/or component that is part of a distributed controller as described above; for instance, flight controller 104 may be and/or include a distributed flight controller made up of one or more sub-controllers. For example, and without limitation, sub-controller 532 may include any controllers and/or components thereof that are similar to distributed flight controller and/or flight controller as described above. Sub-controller 532 may include any component of any flight controller as described above. Sub-controller 532 may be implemented in any manner suitable for implementation of a flight controller as described above. As a further non-limiting example, sub-controller 532 may include one or more processors, logic components and/or computing devices capable of receiving, processing, and/or transmitting data across the distributed flight controller as described above. As a further non-limiting example, sub-controller 532 may include a controller that receives a signal from a first flight controller and/or first distributed flight controller component and transmits the signal to a plurality of additional sub-controllers and/or flight components.

Still referring to FIG. 5, flight controller may include a co-controller 536. As used in this disclosure a "co-controller" is a controller and/or component that joins flight controller 124 as components and/or nodes of a distributer flight controller as described above. For example, and without limitation, co-controller 536 may include one or more controllers and/or components that are similar to flight controller 124. As a further non-limiting example, co-controller 536 may include any controller and/or component that joins flight controller 124 to distributer flight controller. As a further non-limiting example, co-controller 536 may include one or more processors, logic components and/or computing devices capable of receiving, processing, and/or transmitting data to and/or from flight controller 124 to distributed flight control system. Co-controller 536 may include any component of any flight controller as described above. Co-controller 536 may be implemented in any manner suitable for implementation of a flight controller as described above.

In an embodiment, and with continued reference to FIG. 5, flight controller 124 may be designed and/or configured to perform any method, method step, or sequence of method steps in any embodiment described in this disclosure, in any order and with any degree of repetition. For instance, flight controller 124 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 6:
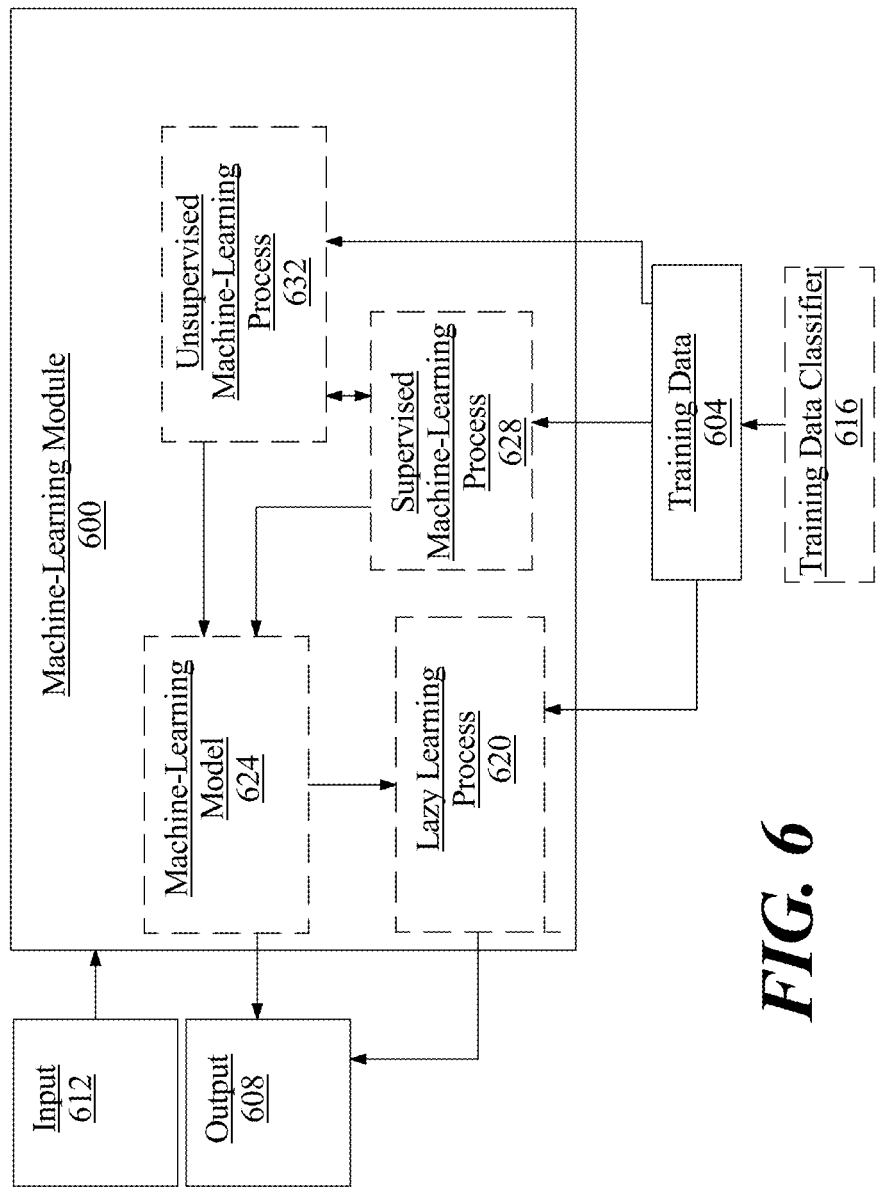
FIG. 6 is a block diagram of an exemplary embodiment of a machine-learning module.

Referring now to FIG. 6, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 604 to generate an algorithm that will be performed by a computing device/module to produce outputs 608 given data provided as inputs 612; this is in contrast to a non-machine learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative example flight elements and/or pilot signals may be inputs, wherein an output may be an autonomous function.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 600 may generate a classifier using a classification algorithm, defined as a processes whereby a computing device and/or any module and/or component operating thereon derives a classifier from training data 604. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 412 may classify elements of training data to sub-categories of flight elements such as torques, forces, thrusts, directions, and the like thereof.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

Further referring to FIG. 6, machine learning processes may include at least an unsupervised machine-learning processes 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 7:
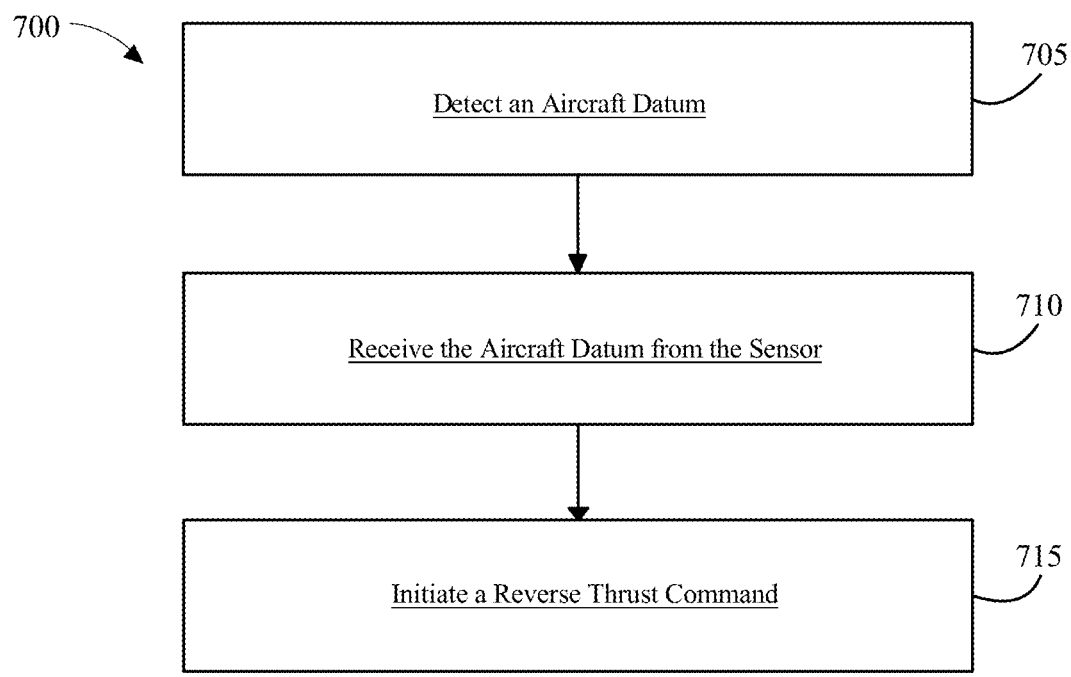
FIG. 7 a block diagram illustrating an exemplary embodiment of a method of a reverse thrust capability.
Figure 8:
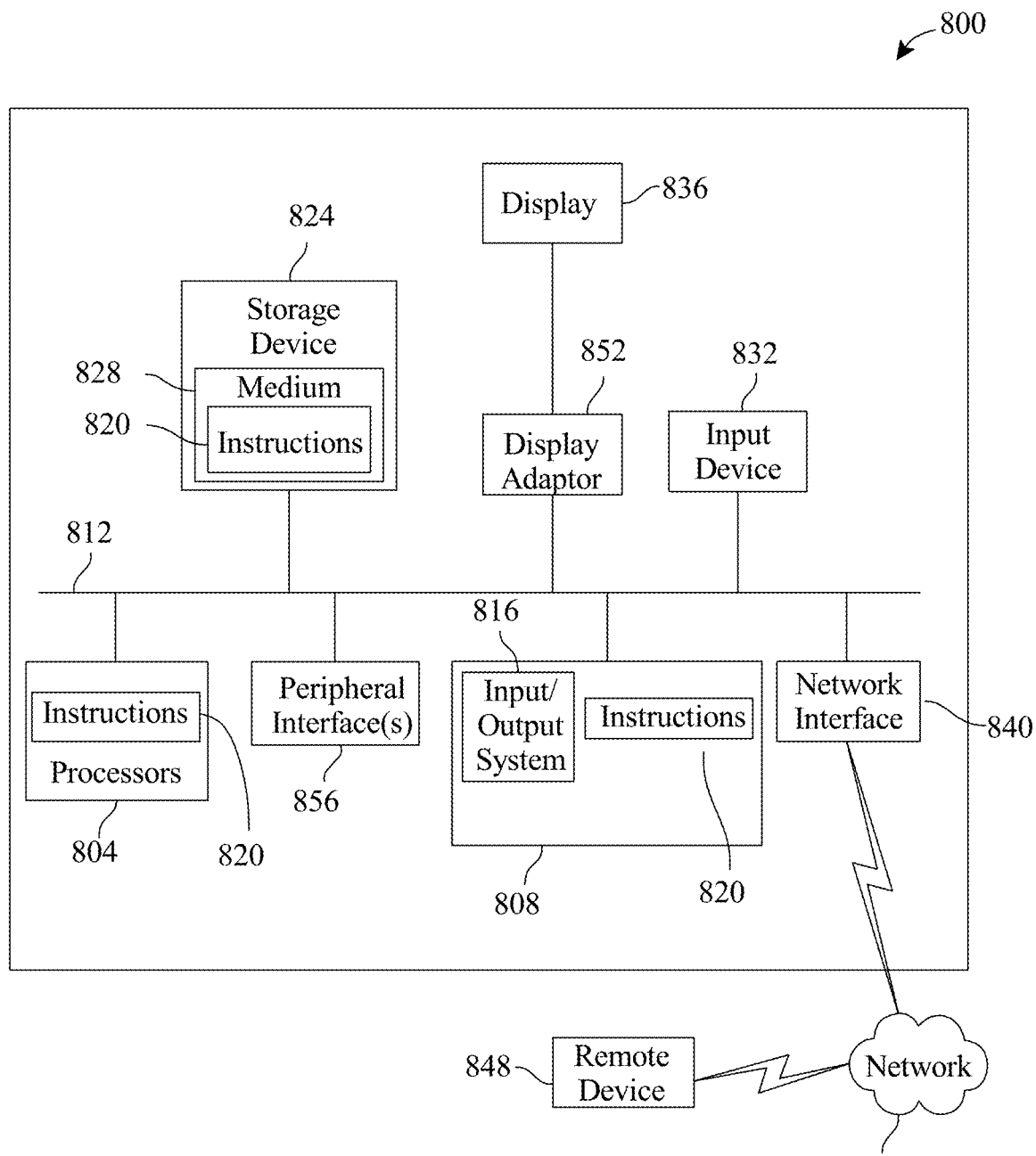
FIG. 8 is a block diagram of a computing system that can be used to implement any one or more of the methodologies disclosed herein and any one or more portions thereof.

Now referring to FIG. 7, a method of an exemplary embodiment 700 of a reverse thrust capability is illustrated. At step 705, a sensor 116 detects an aircraft datum. Sensor 116 includes any of the sensor 116 as described above, in reference to FIGS. 1-6. Aircraft datum includes any of the aircraft datum as described above, in reference to FIGS. 1-6.

Still referring to FIG. 7, at step 710, a flight controller 120 receives aircraft datum from sensor 116. Flight controller 120 includes any of the flight controller 120 as described above, in reference to FIGS. 1-6.

Still referring to FIG. 7, at step 715, flight controller 120 initiates a reverse thrust command. Reverse torque command includes any of the reverse thrust command as described above, in reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

FIG. 7 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An aircraft having reverse thrust capabilities, the aircraft comprising:
   a fuselage;
   a plurality of flight components configured to enable the aircraft to operate in a low-speed flight mode comprising a low-speed threshold;
   a pilot control located within the fuselage;
   a sensor attached to the pilot control configured to detect an aircraft datum from the pilot control;
   an energy source configured to provide power to a flight component of the plurality of flight components; and
   a flight controller, located within the fuselage, wherein the flight controller:
      receives, while the aircraft is operating in the low-speed flight mode, the aircraft datum from the sensor at an initial time, wherein the initial time occurs when the flight component produces a positive thrust in a first thrust direction;
      initiates, while the aircraft is operating in the low-speed flight mode, a reverse thrust command as a function of the aircraft datum at a subsequent time, wherein:
         the reverse thrust command causes the flight component to:
            enter a thrust reversal region comprising a regenerative drag operation; and
            produce a negative thrust in a second thrust direction opposite the first thrust direction and while the aircraft is operating in the low-speed flight mode; and
         the subsequent time occurs temporally after the initial time;
      initiates, at the subsequent time, a reverse torque command of flight component or a second flight component as a function of the aircraft datum; and
      commands the flight component to enter a speed reversal region, wherein:
         the speed reversal region comprises a dissipative drag operation, wherein the dissipative drag operation comprises pushing air against a forward motion of the aircraft; and
         the flight component is in a negative speed mode.

2. The aircraft of claim 1, wherein the energy source comprises a plurality of battery cells.

3. The aircraft of claim 1, wherein the flight component comprises a propulsor component configured at a fixed pitch angle.

4. The aircraft of claim 3, wherein the propulsor component includes a puller component.

5. The aircraft of claim 3, wherein the propulsor component includes a pusher component.

6. The aircraft of claim 1, wherein the aircraft operates in the low-speed flight mode when a speed of the aircraft is equal to or less than the low-speed threshold.

7. The aircraft of claim 6, wherein the low-speed threshold is a wing stall speed.

8. The aircraft of claim 1, wherein the low-speed flight mode further comprises a taxiing operation.

9. The aircraft of claim 1, wherein the flight component operates in a forward speed mode at the initial time.

10. The aircraft of claim 1, wherein the flight component enters the thrust reversal region at the subsequent time.

11. The aircraft of claim 10 wherein the regenerative drag operation is configured to recuperate aerodynamic energy.

12. The aircraft of claim 11, wherein recuperating the aerodynamic energy further comprises reaching a reverse thrust level.

13. The aircraft of claim 12, wherein the reverse thrust level is a maximum level of the aerodynamic energy that may be recuperated.

14. The aircraft of claim 1, wherein the flight component operates in a reverse speed mode based on the reverse thrust command at the subsequent time.

15. The aircraft of claim 1, wherein the dissipative drag operation further comprises:
   dissipating a forward momentum by pushing air against the flight component.

16. The aircraft of claim 1, wherein the pilot control is configured to control a principal axis of the aircraft.

17. The aircraft of claim 1, wherein the pilot control is configured to translate a pilot desired torque for the flight component.

18. The aircraft of claim 1, wherein the reverse thrust command is transmitted to at least a power source.

19. The aircraft of claim 1, wherein the reverse torque command instructs the second flight component to reduce or reverse a torque magnitude or a torque direction, and wherein the sensor is further configured to detect the reverse torque command being sent from the flight controller.

20. The aircraft of claim 1, wherein the low-speed threshold is based on aircraft data including one or more of weight data, load factor data, or center of gravity data.

* * * * *